(12) United States Patent
Cleveland

(10) Patent No.: US 8,424,894 B2
(45) Date of Patent: Apr. 23, 2013

(54) BICYCLE FRAME DROPOUTS AND METHODS

(75) Inventor: Christopher Coghlan Cleveland, Minneapolis, MN (US)

(73) Assignee: Speedhound Design Bureau, LLC, Minneapolis, MN (US)

( * ) Notice: Subject to any disclaimer, the term of this patent is extended or adjusted under 35 U.S.C. 154(b) by 522 days.

(21) Appl. No.: 12/545,476

(22) Filed: Aug. 21, 2009

(65) Prior Publication Data

US 2011/0042917 A1    Feb. 24, 2011

(51) Int. Cl.
*B62K 25/02*    (2006.01)
(52) U.S. Cl.
USPC ............................ 280/284; 280/285; 474/116
(58) Field of Classification Search .................. 180/227; 280/284, 285, 288, 278, 287, 260, 259, 261, 280/281.1, 274; 474/116
See application file for complete search history.

(56) References Cited

U.S. PATENT DOCUMENTS

| | | | | |
|---|---|---|---|---|
| 650,238 A | * | 5/1900 | Gubbins | ...................... 474/116 |
| 4,524,989 A | * | 6/1985 | Centeny | ...................... 280/281.1 |
| 4,856,802 A | * | 8/1989 | Schilplin | ....................... 280/288 |
| 5,020,819 A | * | 6/1991 | D'Aluisio et al. | ............. 280/288 |
| 5,076,601 A | * | 12/1991 | Duplessis | ................... 280/281.1 |
| 5,096,215 A | * | 3/1992 | Chonan | ........................... 280/284 |
| 5,292,143 A | | 3/1994 | Stauch et al. | |
| 6,554,307 B1 | | 4/2003 | Ockenden | |
| 7,854,441 B2 | * | 12/2010 | Scurlock | ....................... 280/261 |
| 8,087,686 B1 | * | 1/2012 | Carroll et al. | .................. 280/288 |
| 2008/0116658 A1 | | 5/2008 | Schroeder et al. | |
| 2011/0042917 A1 | | 2/2011 | Cleveland | |

FOREIGN PATENT DOCUMENTS

| | | |
|---|---|---|
| DE | 102 00 568 A1 | 7/2003 |
| DE | 10200568 | * 7/2003 |
| EP | 0244885 | * 11/1987 |
| EP | 1479602 | * 11/2004 |
| EP | 1671878 | * 6/2006 |

* cited by examiner

*Primary Examiner* — Anne Marie M Boehler
(74) *Attorney, Agent, or Firm* — Billion & Armitage; Benjamin C. Armitage

(57) ABSTRACT

Described are dropout assemblies for bicycles, which include a receiver and a dropout. The dropout assemblies can allow a single bicycle frame to be compatible with various drivetrains, wheels and other components and accessories. The receiver may include inner and outer mounting surfaces on which a dropout may be mounted. The dropout may include first and second mounting surfaces formed to be mounted on the inner or outer mounting surfaces of the receiver. The axle spacing may be adjusted by mounting of either the first or second surface of the dropout on the inner or outer surface of the receiver.

19 Claims, 6 Drawing Sheets

BICYCLE FRAME DROPOUTS AND METHODS

FIELD OF THE INVENTIONS

The present inventions relate to bicycle frames and, more particularly, to dropout assemblies for bicycles.

BACKGROUND OF THE INVENTIONS

All bicycles have points of attachment where the rear wheel axle is affixed to the frame. These attachment points are commonly referred to as "dropouts," because they permit the rear wheel to drop from the frame after the axle attachment hardware is loosened. The present disclosure uses the term "dropout" to generally refer to the various types of rear axle attachment structures of a bicycle frame.

Bicycle hubs have axles that typically extend into axle slots on the left and right dropouts. A lock nut or other shoulder near each end of the axle contacts the inner surface of the dropouts and locates the hub laterally between the dropouts. The hub is attached to the dropouts by exerting a clamping force between the axle shoulder and outside of the dropout, through the use of nuts, bolts or a quick release device. Common dropout configurations are the horizontal dropout, vertical dropout, semi-vertical dropout and track dropout. The distance between the locknuts or shoulders on the axle is commonly referred to as the "over locknut dimension." The distance between the inner surfaces of the dropouts typically limits the over lock locknut dimension that may be used with a particular frame.

Bicycle frames are typically designed and manufactured to establish a fixed distance between the inner surface of the dropouts and will accommodate only hubs having a specified over locknut dimension. Other wheel sizes, axle lengths and drivetrain configurations may not be compatible with one particular bicycle frame. Although steel frames can be bent or cold set to change dropout spacing, this can result in visible bowing of the chainstays and seatstays and can weaken the dropouts. Bending a frame requires careful realignment, is time consuming and can be expensive. Frames constructed of aluminum or carbon fiber cannot be bent to change dropout spacing.

In addition to a particular frame setting a fixed distance between dropouts, the design of the dropouts can also limit the components, such as hubs, drivetrains, brakes, and the like, that can be used with the frame. Most road frames are constructed with vertical dropouts intended for use with derailleurs. Vertical dropouts are incompatible with fixed-gear drivetrains because the axle cannot be moved forward or backward to adjust tension on the chain. In another example, frames with rear-opening track style dropouts are ill-suited for use with derailleur gears, because the derailleur inhibits the removal of the wheel.

Hence, a need exists for dropout assemblies that can accommodate various drivetrain types and axles with different over locknut dimensions on a single frame.

SUMMARY OF THE INVENTIONS

Methods and apparatus in accordance with the present inventions may resolve many of the needs and shortcomings discussed above and will provide additional improvements and advantages that may be recognized by those of ordinary skill in the art upon review of the present disclosure.

Apparatus and methods in accordance with certain aspects of the present inventions can allow a single bicycle frame to be compatible with many types of drivetrains, wheels and other components and accessories.

An apparatus in accordance with aspects of the present inventions may include a dropout assembly for a bicycle. The dropout assembly may include a receiver and a dropout. The receiver may be configured to be secured to a bicycle frame. The receiver may define at least one mounting surface. The at least one mounting surface of the receiver may include at least one of an inner mounting surface and an outer mounting surface. The inner mounting surface and the outer mounting surface of the receiver may be substantially planar. The dropout may be secured to the receiver. The dropout may define an axle slot to receive a rear axle of a hub. The dropout may also define a first mounting surface and a second mounting surface. The first mounting surface and the second mounting surface of the dropout may define a substantially planar surface. One the first mounting surface and the second mounting surface may be secured to the mounting surface of the receiver to secure the dropout to the receiver. The dropout may define a first offset distance between the first mounting surface and a first axle contacting surface and a second offset distance between the second mounting surface and a second axle contacting surface. The dropout may further include a component mount secured to at least one of the receiver and the dropout. At least one spacer may be secured between the mounting surface of the receiver and at least one of the first mounting surface and the second mounting surface of the dropout.

An apparatus in accordance with aspects of the present inventions may include a bicycle having an adjustable dropout assembly. The bicycle may include a bicycle frame having an adjustable dropout assembly. The bicycle frame can include a head tube, a bracket, a down tube having a front end and a rear end, where the front end of the down tube is secured to the head tube and the rear end of the down tube connected to the bracket, a seat tube having an upper end and a lower end, the lower end of the seat tube secured to the bracket, a pair of dropout assemblies, and a pair of chainstays having front ends and rear ends, the front ends of the stays secured to the bracket and the rear ends of the stays secured to the receiver. The dropout assembly may include a receiver and a dropout. The receiver may be configured to be secured to a bicycle frame. The receiver may define at least one mounting surface. The at least one mounting surface of the receiver may include at least one of an inner mounting surface and an outer mounting surface. The inner mounting surface and the outer mounting surface of the receiver may be substantially planar. The dropout may be secured to the receiver. The dropout may define an axle slot to receive a rear axle of a hub. The dropout may also define a first mounting surface and a second mounting surface. The first mounting surface and the second mounting surface of the dropout may define a substantially planar surface. The first mounting surface and the second mounting surface may be secured to the mounting surface of the receiver to secure the dropout to the receiver. The dropout may define a first offset distance between the first mounting surface and a first axle contacting surface and a second offset distance between the second mounting surface and a second axle contacting surface. The dropout may further include a component mount secured to at least one of the receiver and the dropout. At least one spacer may be secured between the mounting surface of the receiver and at least one of the first mounting surface and the second mounting surface of the dropout.

A method for adjusting axle spacing of a bicycle frame in accordance with aspects of the present inventions may include providing an adjustable dropout assembly comprising a first dropout secured to a first receiver and a second dropout secured to a second receiver, with a first mounting surface of the first dropout secured to a mounting surface of the first receiver and a first mounting surface of a second dropout secured to a mounting surface of the second receiver, at least one of the first dropout and the second dropout defining an offset between the first mounting surface and the first axle contacting surface, the first axle contacting surface of the first dropout and the first axle contacting surface of the second dropout defining an axle spacing. The method may include a step of removing at least one of the first dropout from the first receiver and the second dropout from the second receiver. The method may also include rotating at least one of the first dropout and the second dropout 180 degrees about an axis defined through the axle portion and the mounting portion of the dropout, and mounting the dropout on the same mounting surface of the receiver. The method may also or alternatively include at least one of mounting the first mounting surface of the first dropout adjacent to the first receiver so that the first dropout contacts another mounting surface of the first receiver and mounting the first mounting surface of the second dropout adjacent to the second receiver so that the second dropout contacts another mounting surface of the second receiver. The step of mounting a spacer between a receiver mounting surface and a dropout mounting surface may also be included in the method.

The use of the dropout assembly in accordance with one or more aspects of the present inventions or various associated methods may have a number of advantages. The dropout assembly may allow for a bicycle frame to be adaptable to nearly any common drivetrain configuration. It may allow a bicycle frame to be adaptable to several wheel sizes, and allows a bicycle frame to be fitted with disk brakes. With a dropout assembly in accordance with the present inventions, a manufacturer may accommodate a wide variety of drivetrains, wheels and other components with fewer bicycle frame models. The dropout assembly may also allow a bicycle shop to offer a wider range of custom bicycle options with a smaller inventory of frames. In addition, the dropout assembly in accordance with one or more aspects of the present inventions may allow a bicycle owner to reconfigure a bicycle to accommodate different riding styles and needs.

Other features and advantages of the inventions will become apparent from the following detailed description and from the claims.

Figure 1:
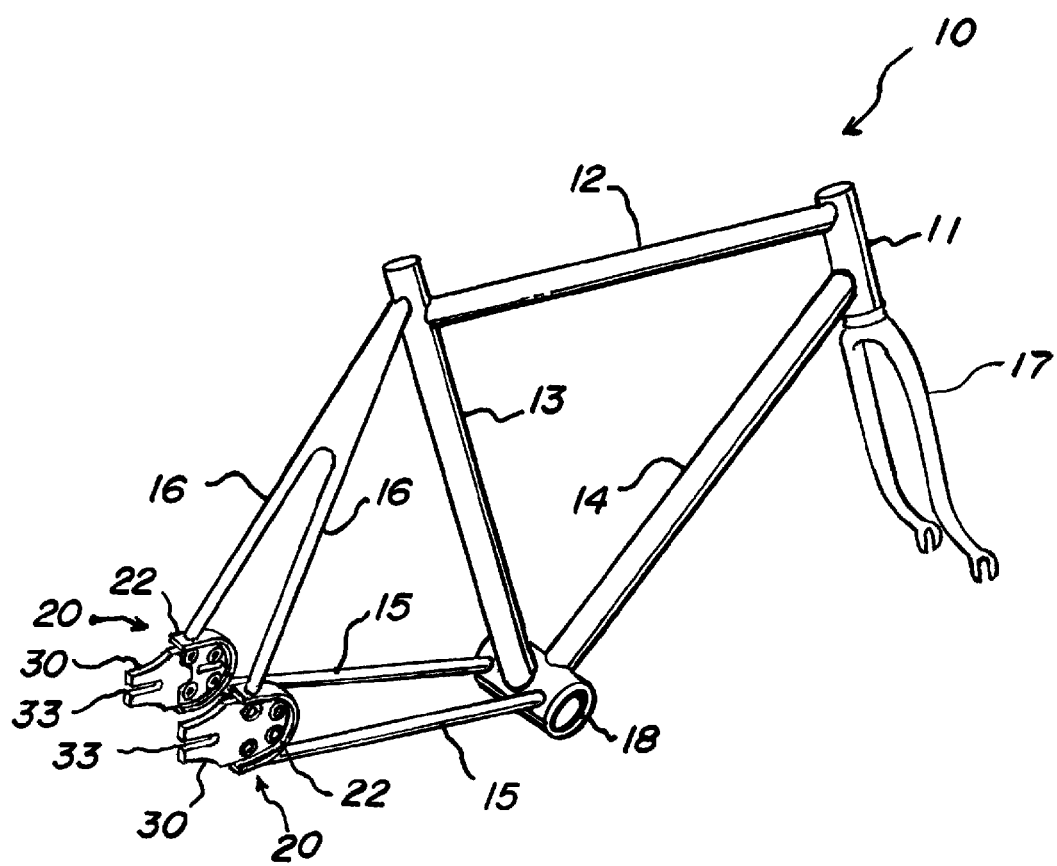
FIG. 1 illustrates a rear perspective view of a bicycle frame in accordance with aspects of the present inventions.

All Figures are illustrated for ease of explanation of the basic teachings of the present inventions only; the extensions of the Figures with respect to number, position, relationship and dimensions of the parts to form the embodiment will be explained or will be within the skill of the art after the following description has been read and understood. Further, the dimensions and dimensional proportions to conform to specific force, weight, strength, flow and similar requirements will likewise be within the skill of the art after the following description has been read and understood.

Where used in various Figures of the drawings, the same numerals designate the same or similar parts. Furthermore, when the terms "top," "bottom," "right," "left," "forward," "rear," "first," "second," "inside," "outside," and similar terms are used, the terms should be understood generally as would be recognized by those skilled in the art and further by reference to the elements as shown in the drawings where necessary to understand the use of the terms in the context of describing the present inventions.

DETAILED DESCRIPTION OF THE INVENTIONS

The figures generally illustrate various embodiments of dropout assembly 20, including aspects of the present inventions. The particular exemplary embodiments of the dropout assembly 20 illustrated in the figures have been chosen for ease of explanation and understanding of various aspects of the present inventions. These illustrated embodiments are not meant to limit the scope of coverage but instead to assist in understanding the context of the language used in this specification and the appended claims. Accordingly, variations of the dropout assembly 20 different from the illustrated embodiments may be encompassed by the appended claims.

A dropout assembly 20 is generally configured to secure the axle of a rear wheel to a bicycle frame 10. A dropout assembly 20 is typically secured to one or more of the chainstay 15 and seatstay 16 of the bicycle frame 10. In certain alternative configurations, the dropout assembly 20 may be secured to a swingarm or other related component of the bicycle frame 10. A frame 10 will typically include a left dropout assembly 20 and a right dropout assembly 20 to secure each end of the axle. In accordance with the present inventions, the dropout assembly 20 may include a receiver 22 and a dropout 30. The receiver 22 is secured, permanently or removably, to the bicycle frame 10. The dropout 30 may be removably mounted at one or more locations on the receiver 22 or may be mounted in one or more orientations at the same location on the receiver 22 to change the dropout spacing 52 between a left dropout 20 and a right dropout 20 of the bicycle frame 10.

The dropout 30 defines a receiver mounting portion 31 and an axle mounting portion 32. The receiver mounting portion 31 is configured to be secured to the receiver 22. The receiver mounting portion 31 of the dropout 30 includes at least a first mounting surface 35 and a second mounting surface 39 each configured to be secured to the receiver 22. The first mounting surface 35 and the second mounting surface 39 may be configured to abut and/or conform to an inner mounting surface 28 and/or an outer mounting surface 29 of the receiver 22. The axle mounting portion 32 defines the axle slot 33. The axle slot 33 is configured to receive and secure the axle of the rear hub 50. The axle slot 33 is generally oriented to receive an axle when the dropout 30 is secured to a receiver 22. In certain aspects, the axle slot 33 may extend rearward, downward, upward, forward or various directions between these orientations depending on the configuration of the dropout 30 and the orientation of the dropout 30 in the receiver 22. In certain embodiments, not shown, two or more axle slots 33 may be defined by the dropout 30.

In certain embodiments, the dropout 30 may be reversible so that both the first mounting surface 35 and the second mounting surface 39 may be secured to at least one of the inner mounting surface 28 and the outer mounting surface 29 of the receiver 22. In this embodiment, the dropout 30 may be reversed by rotating the plate by 180 degrees about axis 100. In other embodiments, the first mounting surface 35 of the dropout 30 may be configured to be secured to the inner mounting surface 28 of the receiver 22 and the second mounting surface 39 may be configured to be secured to the outer mounting surface 29 of the receiver 22. In other embodiments, the dropout 30 may be configured to be secured to a receiver 22 on either side of the bicycle. In these embodiments, the dropout spacing 52 defined between the right and left dropouts 30 is varied by one or more of the alternative mounting position and orientation of the dropouts 30 in the right and left receivers 22.

The axle mounting portion 32 may also define a first axle contacting surface 58 and a second axle contacting surface 59. The first axle contacting surface 58 and the second axle contacting surface 59 are typically adjacent to the axle slot 33. The first mounting surface 35 and the first axle contacting surface 58 are typically on a first side of the dropout 30 and the second mounting surface 39 and the second axle contacting surface 59 are on a second side of the dropout 30. At least one of the first axle contacting surface 58 and the second axle contacting surface 59 of the axle portion 32 of the dropout 30 is offset from the corresponding first mounting surface 35 and second mounting surface 39 by an offset distance 37. The offset distance 37 is a distance between an axle contacting surfaces 58, 59 and the corresponding mounting surfaces 35, 39 of the dropout 30. In accordance with aspects of the present invention, an offset distance 37 between the first mounting surface 35 and the first axle contacting surface 58 is different from an offset distance 37 between the second mounting surface 39 and the second axle contacting surface 5. Thus, a dropout spacing 52 between a right dropout 30 and a left dropout 30 is different when the mounted orientation of at least one dropout 30 in the dropout assembly 20 is changed. In certain embodiments, the offset distance 37 of one or more of the dropouts 30 may be 2.5 millimeters or multiples thereof. Typically, the offset distance 37 may be between 0.0 millimeters and 10.0 millimeters. In certain embodiments, one of a first offset distance 37 and a second offset distance 37 may be 0.0 millimeters. The offset distance 37 between a first axle contacting surface a first receiver contacting surface and a second axle contacting surface and a second a receiver contacting surface of the same dropout 30 are typically different. In certain embodiments, the offset distance 37 may be the distance between a plane defined by the axle contacting surfaces 58, 59 and the plane defined by the mounting surfaces 35, 39 of the dropout 30. In other aspects, spacers 40 may also be provided to further vary the dropout spacing 52.

The dropouts 30 may also include component mounts in the form of one or more ears, tabs or other mounting structures to accommodate various brake and derailleur systems or to permit the attachment of accessories such as for example racks, fenders, and trailer hitches.

The receiver 22 may be permanently secured or removably secured to the frame 10. The receiver 22 may be attached to the frame 10 using a number of methods, including, screws, one or more nuts and bolts, various other fasteners, brazing, welding, adhesives and other methods that will be recognized by those skilled in the art upon review of the present disclosure. The receiver 22 may be a single unitary component or may be configured as two or more components. When configured as two or more components, the receiver may define a gap between a lower receiver portion 48 and an upper receiver portion 49. The gap may be configured to receive a belt or chain of the bicycle to prevent the need to provide a break in the belt or chain when mounting it to a frame with both a seatstay 16 and a chainstay 15. The receiver 22 may also include one or more component mounts such as ears, tabs or other mounting structures to accommodate various brake and derailleur systems or to permit the attachment of such as for example racks, fenders, and trailer hitches. The receiver 22 may include a front portion 24 and a rear portion 26. The front portion 24 configured to be secured to one or more of the lower end of a seatstay 16 and the rear end of a chainstay 15. The front portion 24 may be otherwise configured to be mounted on a non-conventional frame 10, such as frames 10 that have a modified or combined chainstay/seatstay, and/or frames 10 that have only one stay or a swingarm rather than both a chainstay 16 and a seatstay 15.

The rear portion 26 of the receiver 22 may define one or both an inner mounting surface 28 and an outer mounting surface 29 to which a dropout 30 may be secured. The inner mounting surface 28 and outer mounting surface 29 are generally configured to receive and secure at least a portion of the dropout 30. In certain aspects, the inner mounting surface 28 and the outer mounting surface 29 of the receiver 22 may each be configured to receive at least one of the first mounting surface 35 and the second mounting surface 39 of at least one dropout 30. The inner mounting surface 28 and the outer mounting surface 29 may be substantially flat and correspond to one or more flat portions of the first mounting surface 35 and the second mounting surface 39 of the dropout 30. The rear portion 26 of the receiver 22 also may define or include a flange 27 extending around or adjacent to at least a portion of the inner mounting surface 28 and/or outer mounting surface 29. The flange 27 may one or more of assist in aligning the dropout 30, protect the dropout 30, and support at least a portion of the load exerted on dropout 30 during use. In certain aspects, the flange 27 may be peripherally positioned about at least a portion of one or more of the inner mounting surface 28 and outer mounting surface 29. The flange 27 may be perpendicular to a mounting surface 29 of the receiver 22, or it may be attached at other angles. The flange 27 may extend a distance from one or more of the inner mounting surface 28 and outer mounting surface 29 that is equal to or greater than the thickness of the mounting portion 31 of the dropout 30. The flange may also vary in thicknesses along its length or otherwise. The edges 25 of the flange 27 may be flat or rounded or other configurations, as would be recognized by those skilled in the art upon review of the present disclosure. In certain aspects, the flange 27 may correspond in shape with at least a portion of the dropout 30.

The dropout assembly 20 may further include a spacer 40. The spacer 40 may be configured to conform to a receiving surface 28, 29 of the receiver 22. The spacer 40 is reversible and may contact an inner or outer surface 28, 29 of the receiver and/or a first or second 35, 39 surface of the dropout 20. A spacer 40 can be used to adjust the over locknut dimension 52.

Receivers 22, spacers 40 and dropouts 30 may be constructed from a variety of materials, including, steel, aluminum, titanium, magnesium, carbon fiber, and various non-metallic materials and alloys as will be recognized by those skilled in the art upon review of the present invention. The dropout assemblies 20 of the invention may be used with bicycle frames constructed from any material to which a conventional dropout can be attached.

A bicycle frame 10 incorporating the dropout assembly 20 in accordance with aspects of the present inventions may be adaptable to use a variety of components with one or more sets of dropouts 30, including, the following presently available drivetrain configurations, among others: (1) derailleur gearing designed for road bicycles having a rear axle with an over locknut dimension (OLD) of 130 mm; (2) derailleur gearing designed for mountain bicycles having a rear axle with an OLD of 135 mm, with or without a disk brake; (3) fixed gears designed for track bicycles having a rear axle with an OLD of 120 mm, 125 mm, 130 mm or 135 mm; (4) single speed freewheel gearing having a rear axle with an OLD of 120 mm, 125 mm, 130 mm or 135 mm; and (5) internal geared multi-speed hubs having a rear axle with an OLD of 120 mm, 125 mm, 130 mm or 135 mm. These variations are achieved by mounting dropouts 30 on inner or outer surfaces 28, 29 of receivers 22, reversing the orientation of the dropout 30, interchanging dropouts 30 or substituting one type of dropout 30 for another. The replaceability of dropouts 30 allows a frame 10 to be adapted to any existing component standard, as well as obsolete or yet to be developed standards. The use of spacers 40 of varying thicknesses also allows dropouts 30 to be spaced to non-standard dimensions. A further advantage is that damaged dropouts 30 may be easily replaced.

FIG. 1 shows a rear perspective view of a conventional bicycle frame 10 having a dropout assembly 20 in accordance with aspects of the present inventions. In the embodiment shown in FIG. 1, the bicycle frame 10 includes head tube 11, top tube 12, down tube 14, seat tube 13 seatstays 16 and chainstays 15. The head tube 11 is connected to the front end of top tube 12, front fork 17 and the front end of down tube 14. The rear end of top tube 12 is connected to the upper end of seat tube 13 and the upper ends of seatstays 16. The lower end of seat tube 13 is connected to a bottom bracket 18, which is connected to the lower end of the down tube 14 and the front ends of the chainstays 15. Receivers 22 of dropout assemblies 20 are connected, in this embodiment, to the lower ends of seatstays 16 and the rear ends of chainstays 15. Dropouts 30 of dropout assemblies 20 are connected to the receivers 22.

Figure 2A:
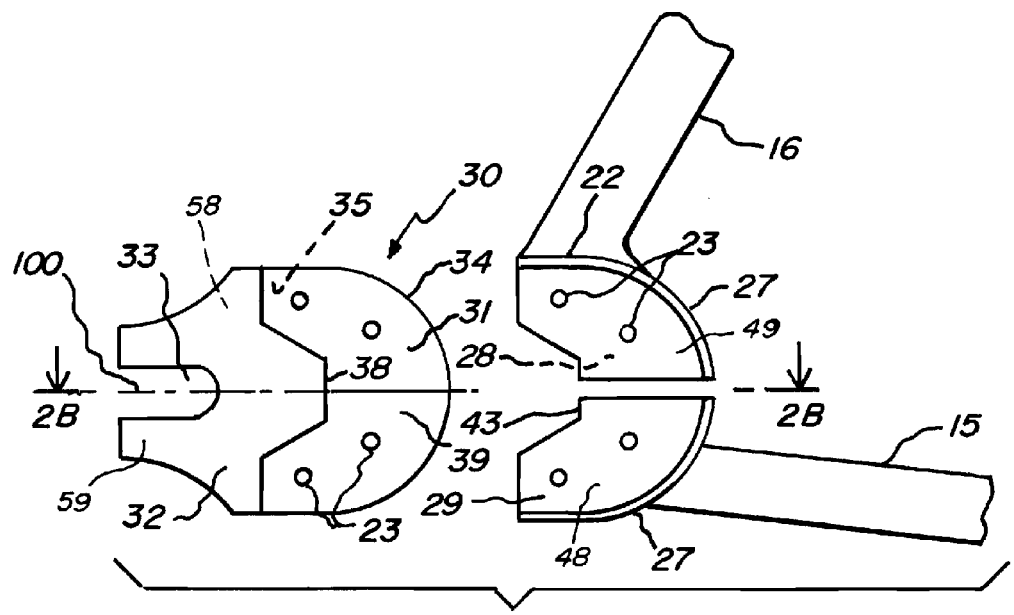
FIG. 2A illustrates a side view of an exemplary embodiment of a dropout assembly with the dropout removed from the receiver in accordance with aspects of the present inventions.
Figure 2B:
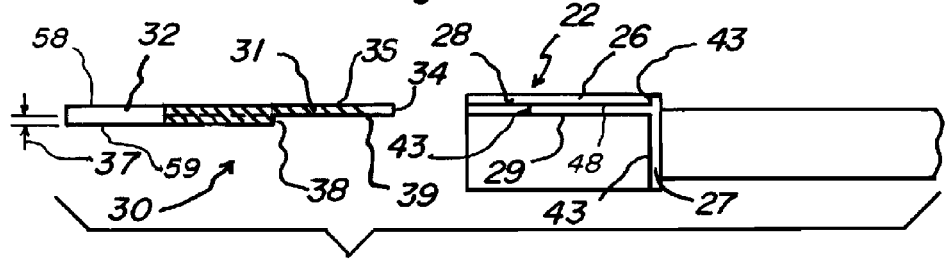
FIG. 2B illustrates a cross sectional view through section line 2B-2B of the embodiment illustrated in 2A.

FIGS. 2A and 2B show side views of one embodiment of the dropout assembly 20 of the invention. In this embodiment, the dropout assembly 20 is a rear-opening, track style dropout viewed from the right side. The dropout 30 fits into the receiver 22 like a lock and key. The receiver 22 in this embodiment, is a two piece receiver and includes inner surfaces 28 and flanges 27 on each side of inner surfaces 28. The flanges 27 are perpendicular to the inner and outer surfaces 28, 29 of the receiver 22. as shown in FIG. 2B. The inner and outer surfaces 28, 29 of the receiver 22 correspond to the mounting portion 31 of the dropout 30. The mounting portion 31 of dropout 30 may have openings to match openings 23 in the inner and outer mounting surfaces 28, 29 of the receiver 22. The mounting portion 31 of the dropout 30 is secured to the inner mounting surface 28 of the receiver 22 with fasteners 42, as shown in FIG. 2C. The fasteners may be threaded or other types of fasteners as will be recognized by those skilled in the art upon review of the present disclosure. In this embodiment, the dropout 30 and the receiver 22 can be used interchangeably on both the right and left sides of the bicycle; as identical receivers may be attached to both the left and right seatstays 16 and chainstays 15 of the bicycle frame.

FIG. 2B shows cross sectional views of one embodiment of the dropout assembly 20. The receiver 22 has inner 28 and outer 29 mounting surfaces. A flange 27 is perpendicular to the mounting surfaces 28, 29 of the receiver 22. The dropout 30 has an offset distance 37. In this embodiment, the thickness of offset distance 37 is about the same thickness of the rear portion 26 receiver 22, so that when the second mounting surface 39 of the dropout 30 contacts the inner mounting surface 28 of the receiver 22, the offset distance 37 of the dropout 30 is flush with the rear portion 26 receiver 22.

FIG. 2C shows a side view of the dropout assembly 20 of the embodiment illustrated in FIG. 2A. Here, the dropout 30 is mounted on the receiver 22. In this embodiment, the second mounting surface 39 of dropout 30 contacts the inner mounting surface 28 of the receiver 22. The openings 23 on the receiver 22 and the dropout 30 are aligned and held in position with fasteners 42.

Figure 2D:
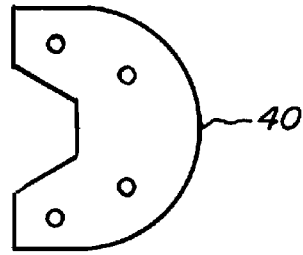
FIG. 2D illustrates a side view of a spacer to be positioned between the dropout and the receiver of the embodiment of the dropout assembly illustrated in FIGS. 2A to 2C.
Figure 2C:
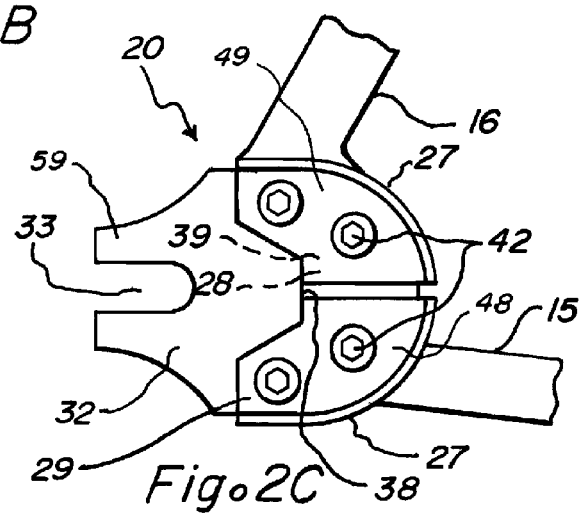
FIG. 2C illustrates a side view of an exemplary embodiment of a dropout assembly with the dropout positioned on the receiver in accordance with aspects of the present inventions.

FIG. 2D illustrates a side view of one embodiment of a spacer 40, which may be optionally placed, in this embodiment, between the inner surface 28 of the receiver 22 and the second mounting surface 39 of the dropout 30. The thickness of spacers 40 may vary. The spacer may also be placed on the first mounting surface 35 of the dropout. Either placement would result in a shorter dropout spacing 52 than the dropout spacing 52 without the spacer.

Figure 3A:
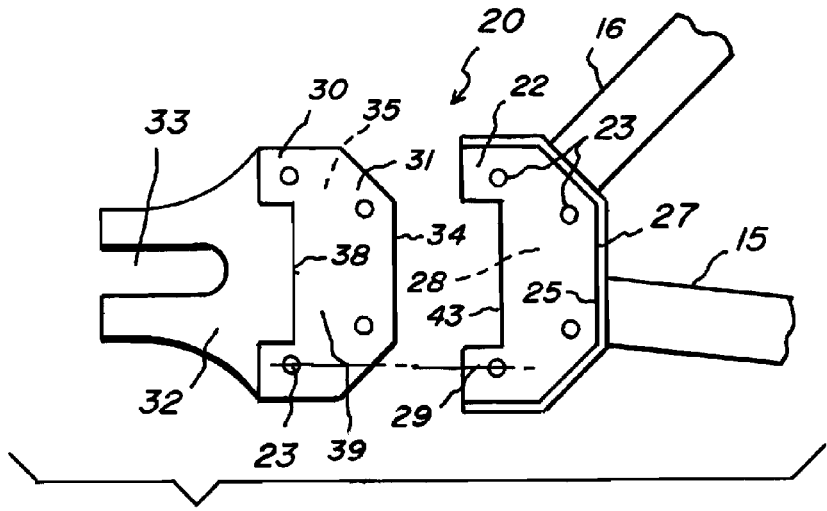
FIGS. 3A, 3B and 3C illustrate side views of other exemplary embodiments of dropout assemblies in accordance with aspects of the present inventions.
Figure 3B:
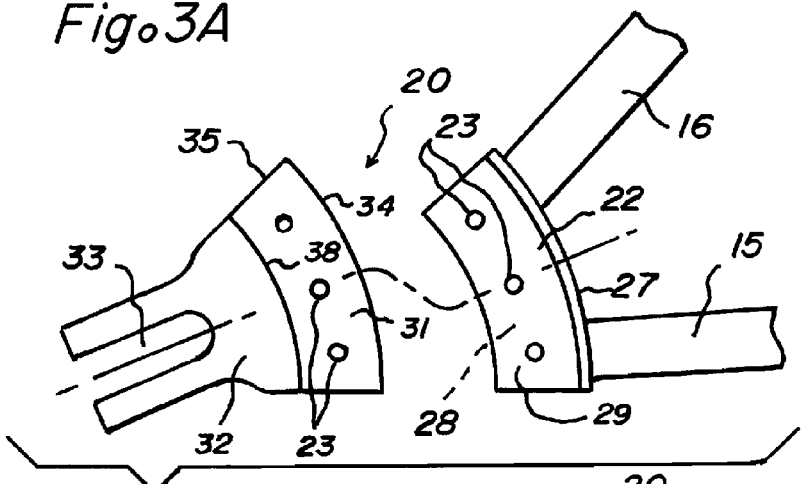
Figure 3C:
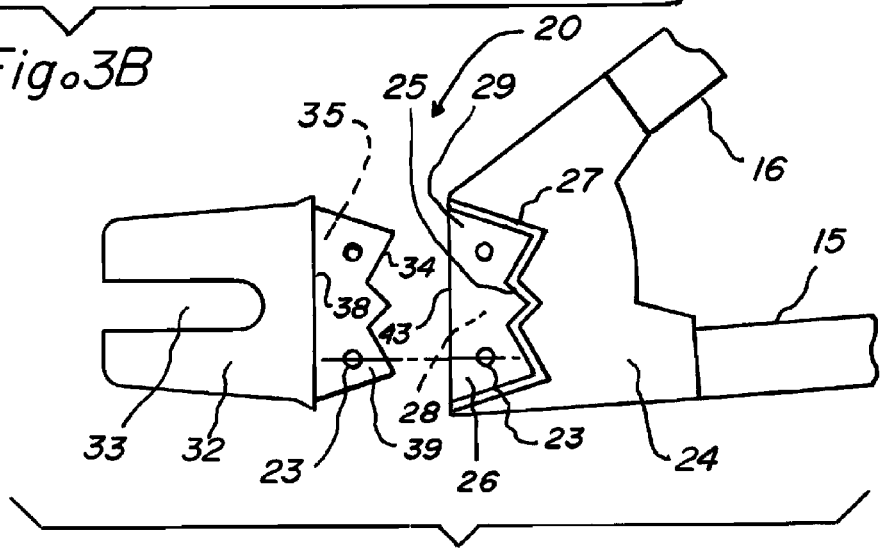

FIGS. 3A to 3C illustrate variations of the dropout assembly 20. In these variations, the dropouts 30 are rear-opening, track style dropouts 30 viewed from the right side. FIG. 3A shows a dropout assembly 20 with a half-hexagonal mounting portion 26 of the receiver 22, which conforms to and may be received against the half-hexagonal mounting portion 31 of dropout 30. FIG. 3B shows a dropout assembly 20 with an arced mounting portion 26 of the receiver 22, which conforms to and may be received against the arced mounting portion 31 of the dropout 30. FIG. 3C shows another variation with a mounting portion 26 of receiver 22 having a jagged edge, which conforms to the upper portion 32 of the dropout 30. The receivers 22 shown in FIGS. 2A-2C and 3A-3C include flanges 27 so that the edge 34 of mounting portion 31 of dropout 30 abuts the inner edge 25 of flange 27 of the receiver 22.

The dropouts 30 shown in FIGS. 2 and 3 are reversible, so that the second mounting surface 39 of the dropout 30 may contact the inner mounting surface 28 of the receiver 22. In this configuration, the mounting portion edge 34 of the mounting portion 31 of the dropout 30 abuts the inner edge 25 of the flange 27 of the receiver 22 to result in a shorter dropout spacing 52 than when the mounting surface 29 of the dropout 30 contacts the outer mounting surface 29 of receiver 22. In an alternate configuration, the dropout 30 may be flipped over so that the first mounting surface 35 of the dropout 30 contacts the inner mounting surface 28 of the receiver 22. In this configuration, the mounting portion edge 34 of the mounting portion 31 of the dropout 30 abuts the inner edge 25 of the flange 27 of the receiver 22. In addition, the offset edge 38 of the mounting portion 31 of the dropout 30 abuts the outer edge 43 of the mounting portion 26 of the receiver 22. The offset edge 38 is defined by offset distance 37.

Figure 4A:
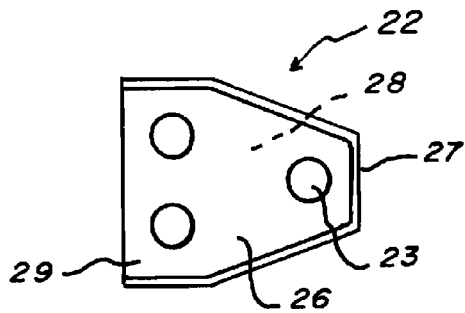
FIGS. 4A, and 4B, illustrate side and perspective views, respectively, of exemplary embodiments of a receiver of a dropout assembly in accordance with aspects of the present inventions.
Figure 4B:
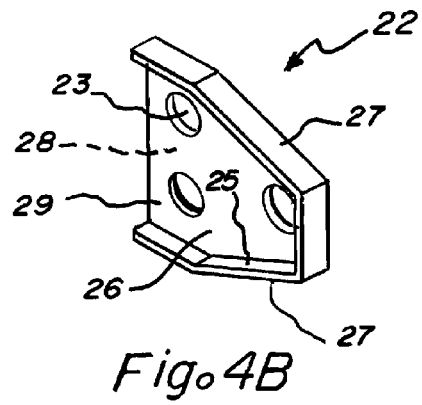
Figure 5A:
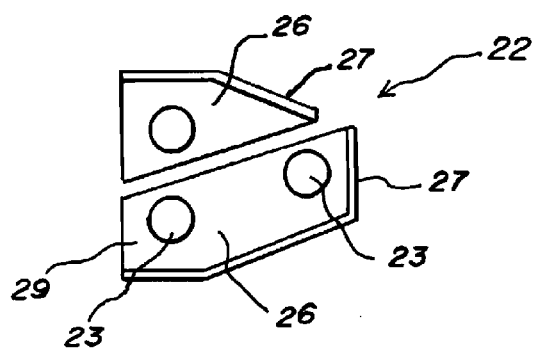
FIGS. 5A and 5B illustrate side and perspective views, respectively, of an exemplary embodiment of a two part receiver of a dropout assembly in accordance with aspects of the present inventions.
Figure 5B:
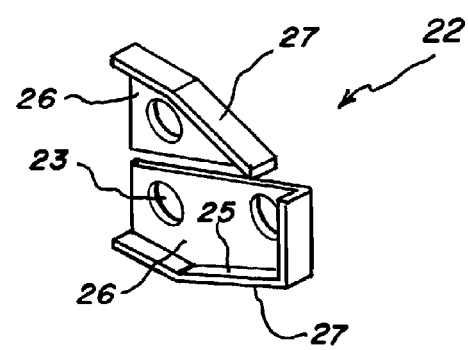
Figure 6A:
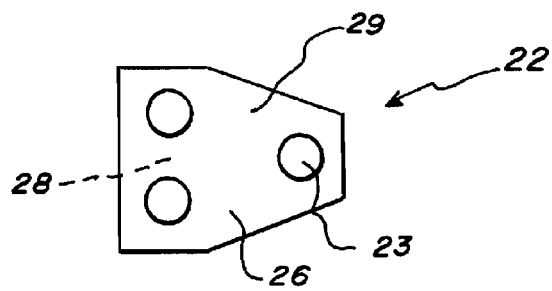
FIGS. 6A and 6B illustrate side and perspective views, respectively, of an exemplary embodiment of a receiver of a dropout assembly in accordance with aspects of the present inventions.
Figure 6B:
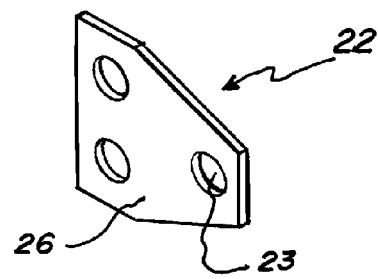

FIGS. 4A, 4B, 5A, 5B, 6A and 6B illustrate several embodiments of receivers 22 of dropout assemblies 20 in accordance with aspects of the present invention. FIGS. 4A and 4B illustrate side and perspective views, respectively, of an angled embodiment of a receiver 22, with a flange 27 perpendicular to the mounting portion 26 of the receiver 22. FIGS. 5A and 5B illustrate side and perspective views, respectively, of an embodiment of a split receiver 22, which includes a flange 27. FIGS. 6A and 6B illustrate side and perspective views, respectively of an embodiment of an angled, flangeless receiver 22.

Figure 7A:
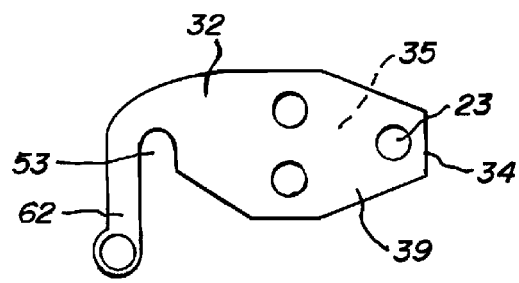
FIGS. 7A and 7B illustrate side and perspective views, respectively, of an exemplary embodiment of a dropout from a dropout assembly in accordance with the present inventions.
Figure 7B:
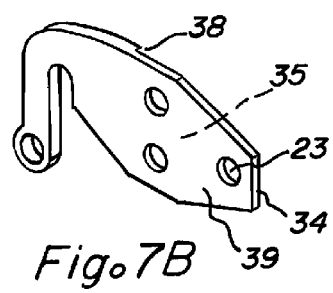
Figure 8A:
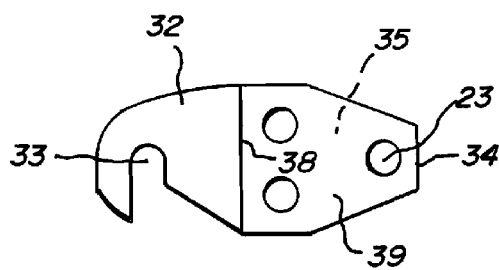
FIGS. 8A and 8B illustrate side and perspective views, respectively, of an exemplary embodiment of a dropout from a dropout assembly in accordance with the present inventions.
Figure 8B:
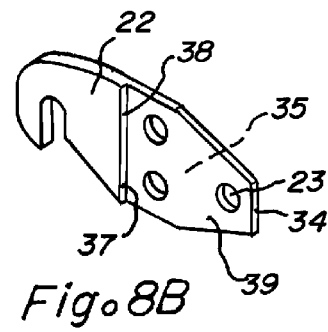
Figure 9A:
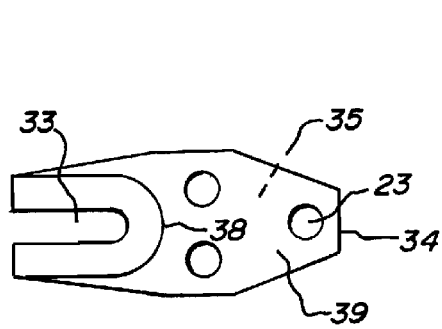
FIGS. 9A and 9B illustrate side and perspective views, respectively, of an exemplary embodiment of a dropout from a dropout assembly in accordance with the present inventions.
Figure 9B:
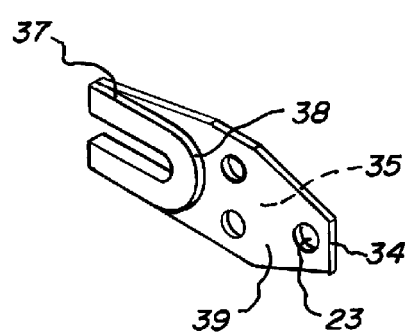

FIGS. 7A, 7B, 8A, 8B, 9A and 9B illustrate several embodiments of dropouts 30 of dropout assemblies 20 in accordance with aspects of the present invention. FIGS. 7A and 7B illustrate side and perspective views, respectively of a dropout 30 with an offset distance 37 on the first mounting surface 35 side of the dropout 30. In this embodiment, the axle slot 33 of the dropout 30 has a vertical opening. This dropout also includes a derailleur mounting ear 62. FIGS. 8A and 8B illustrate side and perspective views, respectively of a dropout 30 with an offset distance 37 on the second mounting surface 39 side of the dropout 30. In this embodiment, the axle slot 33 of the dropout 30 has a vertical opening. FIGS. 9A and 9B illustrate side and perspective views, respectively of a dropout 30 with an offset distance 37 on the second mounting surface 39 side of the dropout 30. In this embodiment, the axle slot 33 of the dropout 30 has a rearward or horizontal opening.

FIGS. 10A to 10D illustrate a rear view of a rear wheel hub with a dropout assembly 20 according to aspects of the inventions. The illustrated dropout assemblies 22 each include a receiver 22 and a dropout 30. The receiver 22 is attached to the frame 10 typically at the lower end of the seatstay 16, not shown, and/or the rear end of the chainstay 15, also not shown. The mounting portion 26 of the receiver extends typically extends rearward and/or downward from one or more of the seatstay 16 and the chainstay 15 of the frame 10. The illustrated dropout 30 includes a mounting portion 31 and an axle portion 32. The axle portion 32 may includes a first axle contacting surface 58 and a second axle contacting surface 59. The first axle contacting surface is offset by an offset distance 37 from the first mounting surface 35. The offset edge 38 is configured to contact and may follow an outer edge 43 of the receiver 22. At least one of the first mounting surface 35 and the second mounting surface 39 of the dropout 30 is secured to one of the inner mounting surface 28 and an outer mounting surface 29 of the receiver 22. The dropouts 30 are illustrated with a wheel hub 50 secured between a first dropout 30 and a second dropout 30. The hub 50 defines an over locknut dimension (OLD). The OLD generally corresponds to the dropout spacing 52 such that the hub 50 may be received between the dropouts 30 when the axle of the hub is positioned through the axle slots 33 of the dropouts 30. The dropout spacing 52 may be determined by the orientation of the dropout 30 in the receiver 22. The offset distance 37, the thickness of the dropout 30 between the first mounting surface 35 and the second mounting surface 39, and the presence or absence and thickness of spacers 40 may in certain configurations determine the offset spacing 52 in each orientation of the dropout 30 within receiver 22. In some embodiments, the hub 50 may be secured to the dropout 20 with a nut and bolt assembly.

The various FIGS. 10A to 10D illustrate different orientations of the components of the dropout assembly 20 to vary the dropout spacing 52 so that different OLDs may be accommodated. FIGS. 10A to 10D particularly illustrate the reversibility of the dropouts 30 about their axis 100, shown in FIG. 2A, as either the first mounting surfaces 35 or the second mounting surfaces 39 of the dropouts 30 can be mounted on the receivers 22 to vary the dropout spacing 52.

Figure 10A:
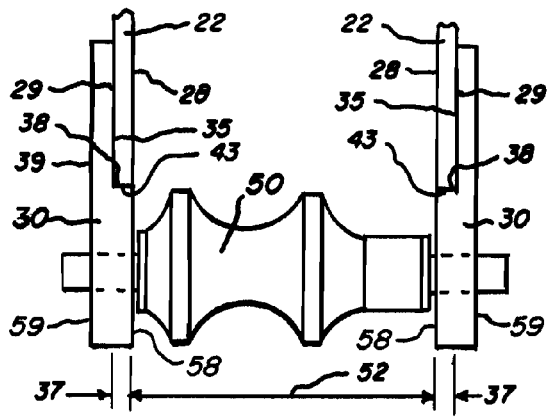
FIGS. 10A to 10D illustrate rear views of different exemplary combinations of the components of dropouts in accordance with aspects of the present inventions.

FIG. 10A shows a rear view of the assembly, which may be configured to give 125 mm between the inner surfaces of the dropouts, depending on the thickness of the receivers 22 and the dropouts 30. The dropouts 30 are mounted on the outer mounting surface 29 of the receivers 22, so that the first mounting surfaces 35 of the dropouts 30 contact the outer mounting surfaces 29 of the receivers 22. In this configuration, the offset distances 37 of the dropouts 30 face inward. In addition, the offset edge 38 of the dropout 30 abuts the outer edge 43 of the receiver 22. Optionally, spacers 40 may be mounted between the outer mounting surface 29 of the receivers 22 and the first surfaces 35 of the dropouts 30 to increase the dropout spacing 52.

Figure 10B:
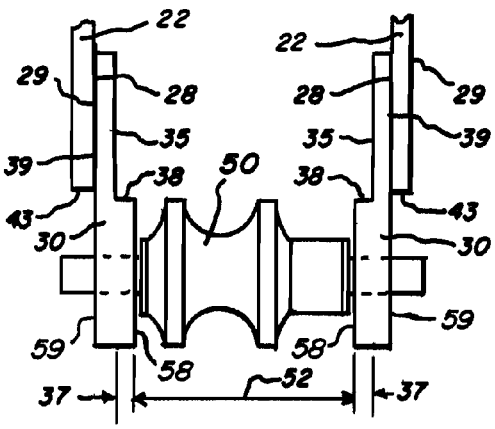

FIG. 10B shows a rear view of the assembly, which may be configured to result in a shorter over locknut dimension 52 than that illustrated in FIG. 10A depending on the thickness of the receivers 22 and the dropouts 30. This configuration is similar to that shown in FIG. 10A, except that the second mounting surface 39 of dropout 30 contacts the inner mounting surface 28 of the receiver 22, resulting in a shorter over locknut dimension 52, than that shown in FIG. 10A. In this configuration, as in the configuration shown in FIG. 10A, the offsets 37 of the dropouts 30 face inward. Optionally, spacers 40 may be mounted between the inner mounting surfaces 28 of the receivers 22 and the second surfaces 39 of the dropouts 30 to decrease the dropout spacing 52.

Figure 10C:
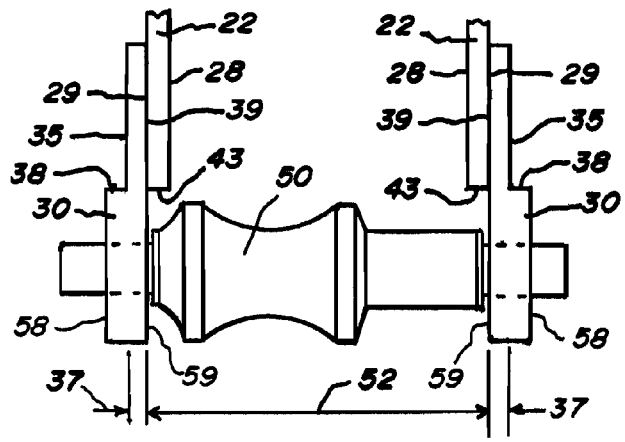

FIG. 10C shows a rear view of the assembly, which may be configured to result in a wider dropout spacing 52 than those illustrated in FIGS. 10A and 10B, depending on the thickness of the receivers 22 and the dropouts 30. The dropouts 30 are mounted on the outer mounting surfaces 29 of the receivers 22, so that the second mounting surfaces 39 of the dropouts 30 contact the outer surfaces 29 of the receivers 22. In this configuration, the offsets 37 of the dropouts 30 face outward. Optionally, spacers 40 may be mounted between the outer surfaces 29 of the receivers 22 and the second mounting surfaces 39 of the dropouts 30 to increase the dropout spacing 52.

Figure 10D:
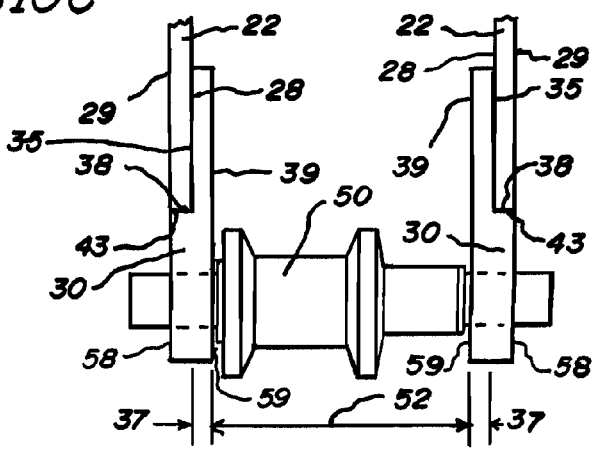

FIG. 10D shows a rear view of the dropout assembly 20, which may be configured to give an over locknut dimension 52 between the inner surfaces of the dropouts 30, depending on the thickness of the receivers 22 and the dropouts 30. This configuration is similar to that shown in FIG. 10A, except that the first mounting surfaces 35 of dropouts 30 contact the inner mounting surfaces 28 of the receivers 22, resulting in a narrower dropout spacing 52, than that shown in FIG. 10A. In this configuration, the offsets 37 of the dropouts 30 face outward. Optionally, spacers 40 may be mounted between the inner mounting surfaces 28 of the receivers 22 and the first surfaces 35 of the dropouts 30 to decrease the dropout spacing 52.

In other aspects, the orientation of the dropouts 30 on the receivers 22 may be asymmetrical. For example, the first mounting surface 35 of a dropout 30 on the right side of the bicycle 10 may contact the outer mounting surface 29 of the receiver 22, and the first mounting surface 35 of a dropout 30 on the left side of the bicycle 10 may contact the inner mounting surface 28 of the receiver. Alternatively, the first mounting surface 35 of a dropout 30 on the right side of the bicycle frame 10 may contact the outer mounting surface 29 of the receiver 22, and the second mounting surface 39 of a dropout 30 on the left side of the bicycle may contact the outer mounting surface 29 of the receiver. Another possible configuration is for the first mounting surface 35 of a dropout 30 on the right side of the bicycle 10 may contact the outer mounting surface 29 of the receiver 22, and the second mounting surface 39 of a dropout 30 on the left side of the bicycle frame 10 may contact the inner mounting surface 28 of the receiver. In another configuration, a spacer 40 may be mounted on a mounting surface of a receiver 22, on the right side of the bicycle frame 10, but not the receiver on the left side of the bicycle, for example. The configurations above are several examples, and other asymmetric configurations are also possible.

The dropout spacing 52 of a bicycle frame 10 may be adjusted by changing the orientation of offset distance 37 of the dropout, by adding or removing a spacer 40, by mounting the dropout 20 on a different mounting surface of a receiver, or by combinations thereof.

In some aspects, the dropout spacing 52 is adjusted by changing the orientation of offset distance 37, which may be accomplished by removing a dropout 30 from the receiver 22 rotating the dropout 30 one hundred eighty degrees about axis 100 and mounting it to receiver 22. For example, if a dropout 30 is mounted on the outer mounting surface 29 of the receiver 22, so that the first mounting surface 35 of the dropout 22 contacts the outer mounting surface 39 of the receiver 22, the dropout spacing 52 may be adjusted by removing the dropout 30 from the receiver 22, rotating the dropout 30 180 degrees about axis 100 and mounting the dropout 30 on receiver 22 so that the second mounting surface 39 of dropout 22 contacts the outer mounting surface 39 of receiver 22.

In other aspects, the dropout spacing 52 is adjusted by adding or removing a spacer 40 from the dropout assembly 20 on the bicycle 10. This may be accomplished by removing a dropout 30 from the receiver 22, removing or adding a spacer 40 from a mounting surface 28, 29 of the receiver and mounting the dropout 30 on the receiver.

In other aspects, the dropout spacing 52 is adjusted by mounting the dropout 30 on another mounting surface of the receiver 22. For example, if a dropout 30 is mounted on the outer mounting surface 29 of the receiver 22, so that the first mounting surface 35 of the dropout 22 contacts the outer mounting surface 39 of the receiver 22, the dropout spacing 52 may be adjusted by removing the dropout 30 from the receiver and mounting the dropout on the inner mounting surface 28 of the receiver 22, so that the first mounting surface 35 of the dropout 22 contacts the inner mounting surface 28 of the receiver 22.

In other aspects the dropout spacing 52 may be adjusted using combinations two or more of the above aspects. For example, the dropout spacing 52 may be adjusted by changing the orientation of offset distance 37 and by mounting the dropout 30 on another mounting surface of the receiver 22. For example, if a dropout 30 is mounted on the outer mounting surface 29 of the receiver 22, so that the first mounting surface 35 of the dropout 22 contacts the outer mounting surface 39 of the receiver 22, the dropout spacing 52 may be adjusted by removing the dropout 30 from the receiver 22, rotating the dropout 30 one hundred eighty (180) degrees about axis 100 and mounting the dropout 30 on receiver 22 so that the second mounting surface 39 of dropout 22 contacts the inner mounting surface 38 of receiver 22. In other embodiments of this aspect, spacers 40 may be added or removed from the dropout assembly.

Using dropouts 30 with different offset thicknesses, spacers with different thicknesses, mounting dropout 30 on either mounting surface 35, 39 of receiver 22, and mounting either mounting surface 28, 29 of the dropout 30 on the receiver may allow for an infinite number of dropout spacings 52 to be achieved.

The drawings and descriptions set forth above provide examples of embodiments including aspects of the present inventions. The dropouts, receivers and spacers in accordance with aspects of the present inventions can be configured in other variations as will be recognized by those skilled in the art upon review of the present disclosure. Accordingly, the scope of the appended claims not be limited to the particular embodiments set forth above.

What is claimed is:

1. A dropout assembly for a bicycle, comprising:
   a receiver configured to be secured to a bicycle frame, the receiver defining at least one mounting surface; and
   a dropout secured to the receiver, the dropout defining an axle slot to receive a rear axle of a hub, the dropout defining a first mounting surface and a second mounting surface, one of the first mounting surface and the second mounting surface secured to the mounting surface of the receiver to secure the dropout to the receiver, the dropout defining a first offset distance between the first mounting surface and a first axle contacting surface and a second offset distance between the second mounting surface and a second axle contacting surface, wherein the first offset distance and the second offset difference are different;
   wherein the dropout is symmetrical along a horizontal axis such that when the dropout is rotated from securing to the receiver on the first mounting surface to the second mounting surface or vice versa, a rear axle spacing is altered.

2. The dropout assembly of claim 1, the at least one mounting surface of the receiver comprising at least one of an inner mounting surface and an outer mounting surface.

3. The dropout assembly of claim 2, further comprising the inner mounting surface and the outer mounting surface of the receiver are substantially planar.

4. The dropout assembly of claim 2, the first mounting surface and the second mounting surface of the dropout defining a substantially planar surface.

5. The dropout assembly of claim 1, further comprising at least one spacer secured between the mounting surface of the receiver and at least one of the first mounting surface and the second mounting surface of the dropout.

6. The dropout assembly of claim 1, the dropout further comprises a component mount secured to at least one of the receiver and the dropout.

7. The dropout assembly of claim 1, wherein the at least one mounting surface of the receiver comprises one of an inner mounting surface and an outer mounting surface, wherein the inner mounting surface and the outer mounting surface of the receiver are substantially planar, wherein the first mounting surface and the second mounting surface of the dropout define a substantially planar surface, further comprising at least one spacer secured between the mounting surface of the receiver and at least one of the first mounting surface and the second mounting surface of the dropout.

8. The dropout assembly of claim 7, wherein the dropout further comprises a component mount secured to at least one of the receiver and the dropout.

9. The dropout assembly of claim 1, wherein the second offset distance is zero millimeters.

10. A bicycle having an adjustable dropout assembly, comprising:
   a bicycle frame; and
   an adjustable dropout assembly comprising:
      a receiver configured to be secured to a bicycle frame, the receiver defining at least one mounting surface; and
      a dropout defining an axle slot to receive a rear axle of a hub, the dropout defining a first mounting surface and a second mounting surface, each of the first mounting surface and the second mounting surface configured to be secured to the at least one of the mounting surface of the receiver, the dropout defining a first offset distance between the first mounting surface and a first axle contacting surface and a second offset distance between the second mounting surface and a second axle contacting surface, the first offset distance being greater than the second offset distance to define a first axle spacing when the first mounting surface of the dropout is secured to the mounting surface of the receiver and a second axle spacing when the second mounting surface of the dropout is secured to the mounting surface of the receiver;
   wherein the dropout is symmetrical along a horizontal axis.

11. A bicycle, as in claim 10, further comprising the bicycle frame comprising:
   a head tube;
   a bracket;
   a down tube having a front end and a rear end; the front end of the down tube secured to the head tube, and the rear end of the down tube connected to the bracket;
   a seat tube having an upper end and a lower end, the lower end of the seat tube secured to the bracket;
   a pair of dropout assemblies that define at least four different lengths for an axle to be mounted thereto; and
   a pair of chainstays having front ends and rear ends, the front ends of the stays secured to the bracket and the rear ends of the stays secured to the receiver.

12. The bicycle, as in claim 11, wherein the first mounting surface and the second mounting surface of the dropout of the adjustable dropout assembly are substantially planar.

13. The bicycle, as in claim 11, further comprising at least one spacer secured between the mounting surface of the receiver and at least one of the first mounting surface and the second mounting surface of the dropout.

14. The bicycle, as in claim 11, wherein the dropout of the adjustable dropout assembly further comprises a component mount secured to at least one of the receiver and the dropout.

15. The bicycle, as in claim 10, the at least one mounting surface of the receiver comprising at least one of an inner mounting surface and an outer mounting surface.

16. The bicycle, as in claim 15, wherein the inner mounting surface and the outer mounting surfaces of the receiver of the adjustable dropout assembly are substantially planar.

17. The bike of claim 10, wherein the second offset distance is zero millimeters.

18. A dropout assembly for a bicycle, comprising:
   a receiver configured to be secured to a bicycle frame, the receiver defining at least one mounting surface; and
   a symmetrical dropout to be secured to the receiver, the dropout defining an axle slot to receive a rear axle of a hub, the dropout including:
      a first side that is planar, the first side including a first surface securable to the receiver and a second surface at which the axle slot extends,
      a second side including a third surface securable to the receiver and a fourth surface at which the axle slot extends,
      wherein the fourth surface is offset from the third surface,
      wherein the first surface and the third surface are at least partially aligned and define a first dimension,
      wherein the second surface and the fourth surface are at least partially aligned and define a second dimension that is greater than the first dimension, such that one of the first surface and the third surface face the at least one mounting surface of the receiver with the dropout secured to the receiver;
   wherein the dropout is rotatable through 180 degrees to allow the third surface to align with the at least one mounting surface in place of the first surface being aligned with the at least one mounting surface which will change a distance available to receive an axle in the axle slot.

19. A dropout assembly for a bicycle, comprising:
   a receiver configured to be secured to a bicycle frame, the receiver defining an inner mounting surface and an outer mounting surface;
   an inner flange perpendicular to the inner mounting surface;
   an outer flange perpendicular to the outer mounting surface; and
   a dropout secured to the receiver, the dropout defining an axle slot to receive a rear axle of a hub, the dropout defining a first mounting surface and a second mounting surface, one of the first mounting surface and the second mounting surface secured to one of the inner or outer mounting surface of the receiver to secure the dropout to the receiver;
   wherein when the dropout is repositioned from securing to the receiver on the inner mounting surface of the receiver to the outer mounting surface or vice versa, a rear axle spacing is altered and wherein the receiver flanges assist in positioning and securing the dropout.

* * * * *